United States Patent [19]

Peek

[11] Patent Number: 4,842,031

[45] Date of Patent: Jun. 27, 1989

[54] SHAPER GUARD

[76] Inventor: William M. Peek, P.O. Box 511, Crane Ct., Kingston Springs, Tenn. 37082

[21] Appl. No.: 272,437

[22] Filed: Nov. 17, 1988

[51] Int. Cl.⁴ ................................................ B23C 9/00

[52] U.S. Cl. .................................. 144/251 A; 83/478

[58] Field of Search ........... 144/251 R, 251 A, 253 R, 144/253 J, 134 A, 136 R; 83/397, 440.2, 478, 860; 409/134; 30/373, 391

[56] References Cited

U.S. PATENT DOCUMENTS

| | | | |
|---|---|---|---|
| 1,183,566 | 5/1916 | Jessrang | 144/251 A |
| 2,754,857 | 7/1956 | Joslin | 83/478 |
| 2,895,518 | 7/1959 | Rhett | 144/251 A |
| 3,880,032 | 4/1975 | Coreen | 83/478 |

FOREIGN PATENT DOCUMENTS

| | | | |
|---|---|---|---|
| 241972 | 9/1946 | Switzerland | 144/251 A |

*Primary Examiner*—W. Donald Bray

*Attorney, Agent, or Firm*—Harrington A. Lackey

[57] ABSTRACT

A shaper guard including an elongated guard body which is fixed to a pair of spaced fences and in front of the shaper head and spaced slightly above the work surface. An elongated planar guard panel is slidably received in a vertical guide slot within the guard body for limited vertical travel between a lower position in which the guard panel rests upon the work surface and an upper position resting on the top of a workpiece moving along the fences and beneath the guard body for operative engagement with the shaper head. The guard panel is biased downward solely by gravity.

8 Claims, 2 Drawing Sheets

SHAPER GUARD

BACKGROUND OF THE INVENTION

This invention relates to a shaper guard, and more particularly to a shaper guard having a gravity-biased guard panel.

A shaper, as used in the art of woodworking, includes a rotary cutter head having peripheral cutting edges or knife tips in a particular shape, so that when the shaper head is rotated, the continuous elongated shape or contour may be formed in the surface of a wooden workpiece engaging the shaper head. The shaper head is usually mounted on a vertical spindle which is power-driven and projects above the horizontal planar work surface of a table. A pair of upright fences or guide surfaces for the workpiece are mounted in longitudinal alignment, but spaced from each other on opposite sides of the peripheral path of the shaper head. A wooden workpiece, such as an elongated board or plank is manually held against one fence and moved toward the rotating shaper head so that the edge of the board is engaged and shaped by the shaper head.

The above described process is very dangerous, since the wooden workpiece has to be held manually at all times, thus exposing the hands and fingers of the operator to being cut by the shaper head if the hands or the workpiece slip. In fact, such an accident has occurred to the Applicant, resulting in the loss of parts of four fingers.

Because of the high degree of danger in the operation of shaper heads in woodworking, various attempts to provide shaper guards have been made.

The following U.S. patents disclose various types of shaper guards and/or linear-type clamping bars utilized on cutting or shaping machines:

| | | |
|---|---|---|
| 300,363 | Harps | June 17, 1884 |
| 883,148 | Sanders | Mar. 24, 1908 |
| 938,273 | Richards | Oct. 26, 1909 |
| 1,183,566 | Jessrang | May 16, 1916 |
| 4,499,933 | Thompson | Feb. 19, 1985 |

Every one of the guards or clamping bars disclosed in the above patents includes a spring for biasing the guard or clamp piece downward to assist in holding the workpiece upon the table as it is moved in engagement with the cutter head or shaper head.

Both the Harps and the Jessrang patents disclose elongated guard bars having opposite curved ends to facilitate camming of the guard bar upward when engaged by the wooden workpiece.

Harps and Sanders disclose single elongated guards or clamp pieces. Moreover, the clamping board 19 of Sanders is primarily designed for holding the workpiece rather than for guarding or protecting the operator from the cutting knives.

The Richards patent discloses a circular or partially circular guard 5 having a rotary guard piece or chip breaker 15 and a pivotal work clamping member 12 (FIGS. 1-6); 23 (FIG. 7); and 26 (FIG. 8).

Although the Jessrang patent discloses a two-piece guard member including a vertically movable guard 22, nevertheless, the guard 22 is biased downwardly by the leaf spring 24.

The two-piece guard members disclosed in Thompson are biased downward by springs and also are so widely separated from each other that no protection is afforded to direct access of the operator's hands into the cutting area of the shaper head.

The following U.S. patents disclose various types of shaper guards in the form of rings surrounding the cutter or shaper head:

| | | |
|---|---|---|
| 720,039 | Lemmon | Feb. 10, 1903 |
| 822,636 | Steer | June 5, 1906 |
| 907,734 | Butterfield | Dec. 29, 1908 |
| 1,025,866 | Erickson | May 7, 1912 |
| 2,642,104 | Brown | June 16, 1953 |

All of the above ring guards are biased downward by springs.

Of all of the above patents disclosing both linear and ring guards, none of them, except Brown, disclose a guard member normally resting upon the work surface.

Accordingly, none of the above patents disclose a two-piece linear shaper guard including a fixed elongated guard body within which is mounted a vertically movable guard panel biased downwardly by gravity to a normally inoperative position resting upon the table surface, to substantially completely encompass the shaper head and prevent access to the shaper head cutting area by the hand or fingers of the operator.

SUMMARY OF THE INVENTION

It is therefore an object of this invention to provide a shaper guard including a stationary guard body mounted upon the opposed fences of a shaper, slightly above the work surface and spanning the cutting area.

A vertically movable guard panel is mounted on the guard body and biased by gravity at all times downward to an initial position resting upon the work surface.

Another object of this invention is to provide a shaper guard including an elongated guard body mounted across and in front of the shaper head and having a vertical slot for receiving a planar guard panel for limited vertical travel between a lower position resting upon the work surface and an elevated position resting upon the top of a workpiece as the workpiece moves beneath the guard body and in engagement with the shaper head.

A further object of this invention is to provide a two-piece shaper guard including an elongated guard body fixed across the opposed fences of a shaper and in front of the shaper head within which is mounted for limited vertical travel a guard panel, the guard body having a rearwardly opening recess for receiving the periphery of the shaper blades which engage the edge of the wooden workpiece moving beneath the guard body.

Another object of this invention is to provide a two-piece shaper guard which may easily be mounted upon the existing upright fences of a shaper apparatus with a minimum of effort.

Another object of this invention is to provide a shaper guard including a vertically movable guard panel biased downwardly solely by gravity and totally devoid of any springs, to facilitate movement of the workpiece beneath the guard and into engagement with the shaper head, yet which will afford maximum protection to the hands of the operator.

A further object of this invention is to provide a shaper guard having a gravity-biased guard panel which will permit both longitudinal movement and transverse shifting of the workpiece during the cutting operation.

DESCRIPTION OF THE PREFERRED EMBODIMENT

Figure 1:
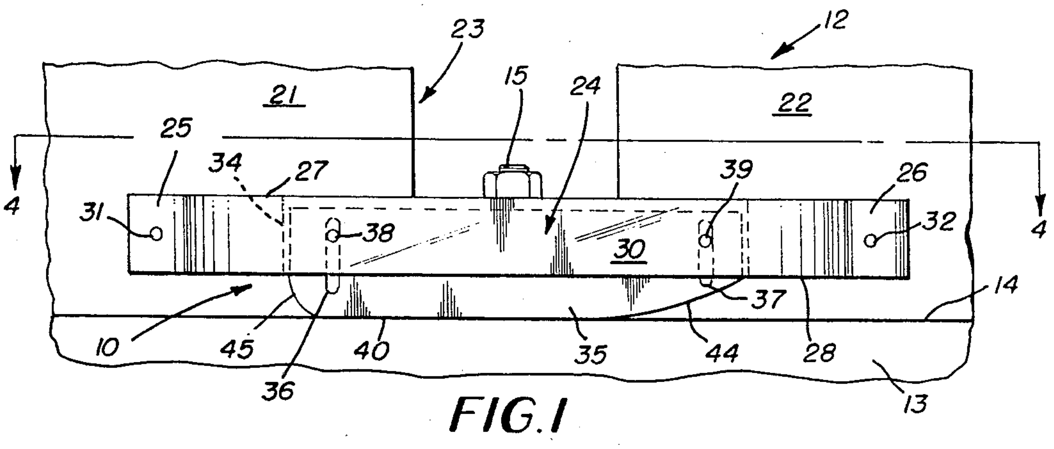
FIG. 1 is a fragmentary front elevational view of a shaper apparatus upon which is mounted the shaper guard made in accordance with this invention, with the guard panel in its lowermost position.

Referring now to the drawings in more detail, the shaper guard 10, made in accordance with this invention, is designed to be utilized upon a conventional shaper apparatus 12, including a table 13 having a top horizontal planar surface 14. Projecting up through the planar surface 14 is a vertical spindle 15 supporting a shaper head or cutter head 16 including a plurality of knives 17 and journaled for rotary movement about a vertical axis. The spindle 15 may be driven in any convenient manner, such as through the transmission 18 and motor 20 shown in phantom in FIG. 3.

Mounted on opposite sides of the shaper head 16 are a pair of longitudinally aligned upright fences 21 and 22 separated by a space 23 to receive the peripheral portions of the knives 17 during rotation. The fences 21 and 22 may be fixed rigidly in any convenient manner to project upward from the table surface 14, in a well known manner.

The parts thus far described are well known in the art of woodworking and shaper machines.

The shaper guard 10 made in accordance with this invention includes an elongated guard body 24 having opposite end portions 25 and 26 and top and bottom surfaces 27 and 28, an inside or rear surface 29 and a front surface 30.

Figure 2:
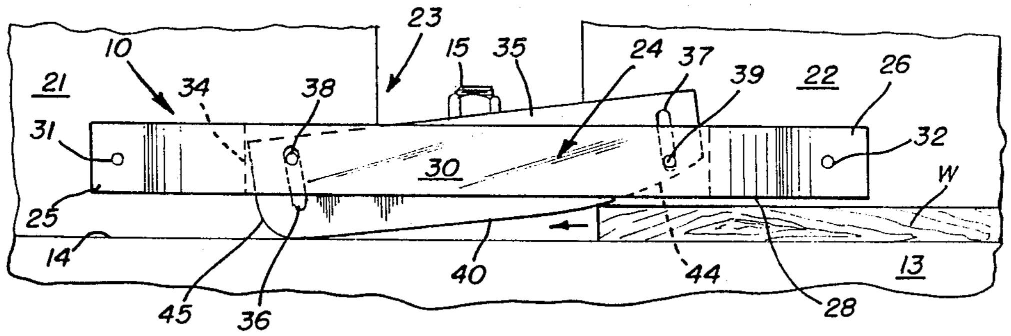
FIG. 2 is a fragmentary front elevational view similar to FIG. 1, illustrating the initial engagement of the workpiece with the guard panel and the resultant elevation of the guard panel.
Figure 3:
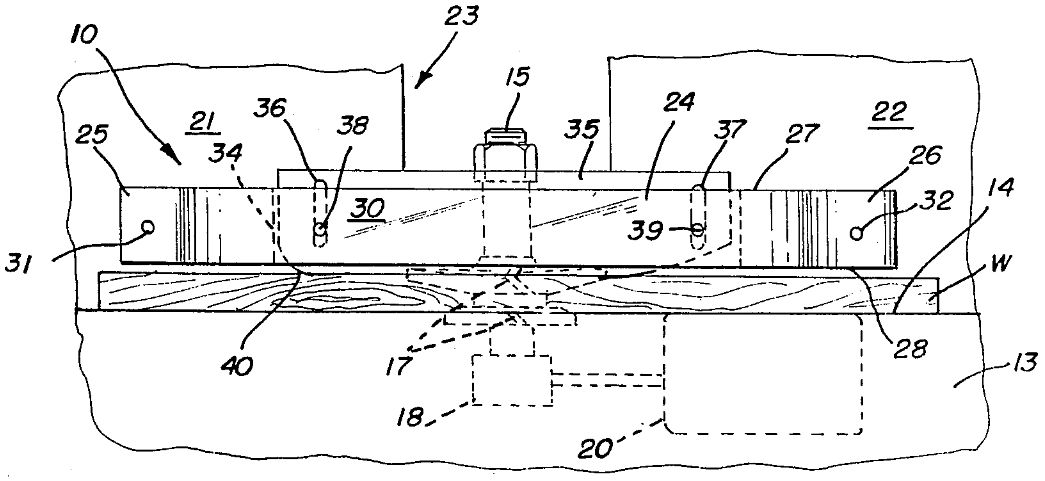
FIG. 3 is a fragmentary front elevational view similar to FIG. 1, in which the guard panel is elevated and resting on top of the workpiece moving beneath the shaper guard, and showing the shaper head in hidden lines.

As viewed in FIGS. 1-3, the left end portion 25 is mounted securely upon the fence 21 by a mounting bolt 31, while the right end portion 26 is mounted upon the front surface of the fence 22 by means of a mounting bolt 32.

The guard body 24 is mounted so that its bottom surface 28 is substantially parallel to and spaced above the horizontal work surface 14 a height, which will just permit the workpiece W to slide longitudinally along the work surface 14 and beneath the bottom surface 28, as illustrated in FIGS. 2 and 3. If workpieces W of different sizes are to be shaped by the shaper head 16, then the guard body 24 will be mounted at an elevation upon the fences 21 and 22 so that the distance between its bottom surface 28 and the work surface 14 is great enough to accommodate the workpiece W of the greatest height. It is also within the scope of this invention to provide for fastener means for the end portions 25 and 26 which will permit vertical adjustment of the guard body 24 in order to accommodate workpieces W of different heights.

The height of the guard body 24 is great enough to prevent any penetration by the operator's hand or fingers into the space 23 from the front of the guard body 24. Thus, the top surface 27 of the guard body 24 will be above the tops of the blade 17.

Formed in the guard body 24 is an elongated vertically disposed guide slot 34, opening through the top surface 27 and the bottom surface 28 of the guard body 24. Freely received within the vertical guide slot 34 for free vertical movement is an elongated vertically disposed planar guard panel 35. Formed in the left end portion of the guard panel 35 is a vertical panel or pin slot 36 closed at its open and lower ends, and formed through the opposite or right end portion of the guard panel 35 is a like vertical panel or pin slot 37 also closed at its upper and lower ends.

Figure 5:
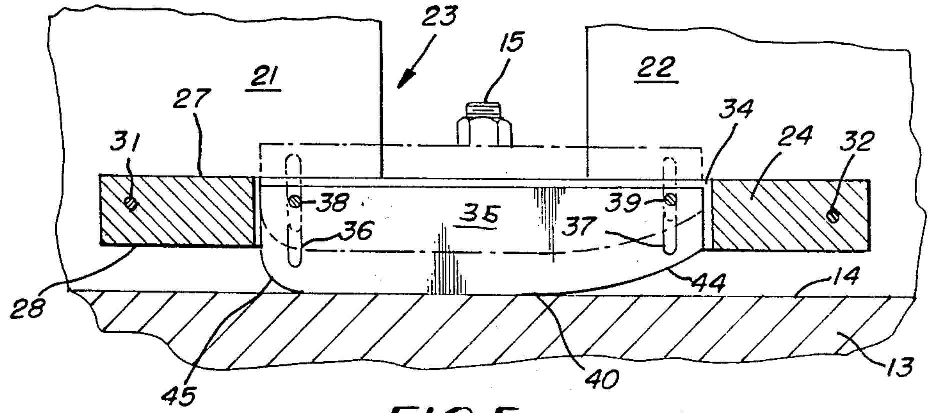
FIG. 5 is a fragmentary section taken along the line 5—5 of FIG. 4.
Figure 6:
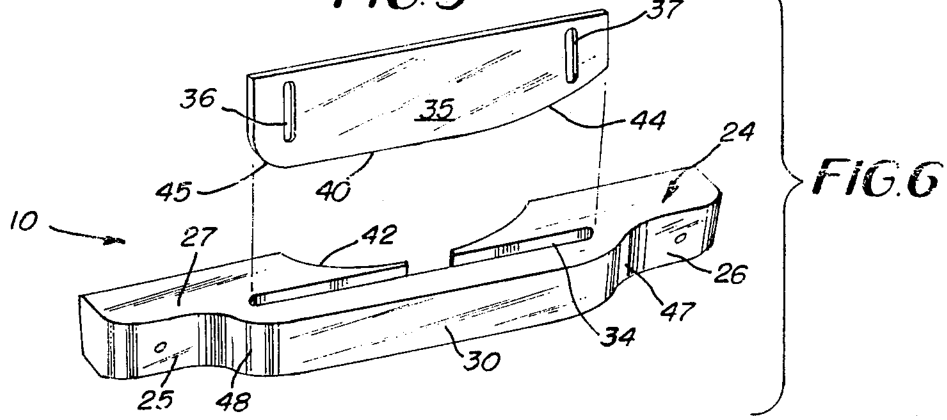
FIG. 6 is a front perspective and exploded view of the shaper guard made in accordance with this invention.

In order to retain the guard panel 35 within the guide slot 34 for limited vertical travel, a pair of transverse pins 38 and 39 extending transversely across the end portions of the guide slot 34 and through the corresponding panel slots 36 and 37. The vertical slots 36 and 37 are long enough to permit the guard panel 35 to move downward by gravity in its guide slot 34 until its bottom elongated surface 40 engages and rests upon the work surface 14, as illustrated in FIGS. 1 and 5. Moreover, the panel slots 36 and 37 are long enough to permit the guard panel 35 to be elevated by the workpiece W to permit the workpiece W to move entirely along the work surface 14 and beneath the guard body 24. The vertical slots 36 and 37 need be no longer than to permit the bottom surface 40 of the guard panel 35 to be flush with the bottom surface 28 of the guard body 24. One upper position of the guard panel 35 is disclosed in FIG. 3 where the guard panel 35 rides on the top surface of the workpiece W as it move along the fences 21 and 22.

Figure 4:
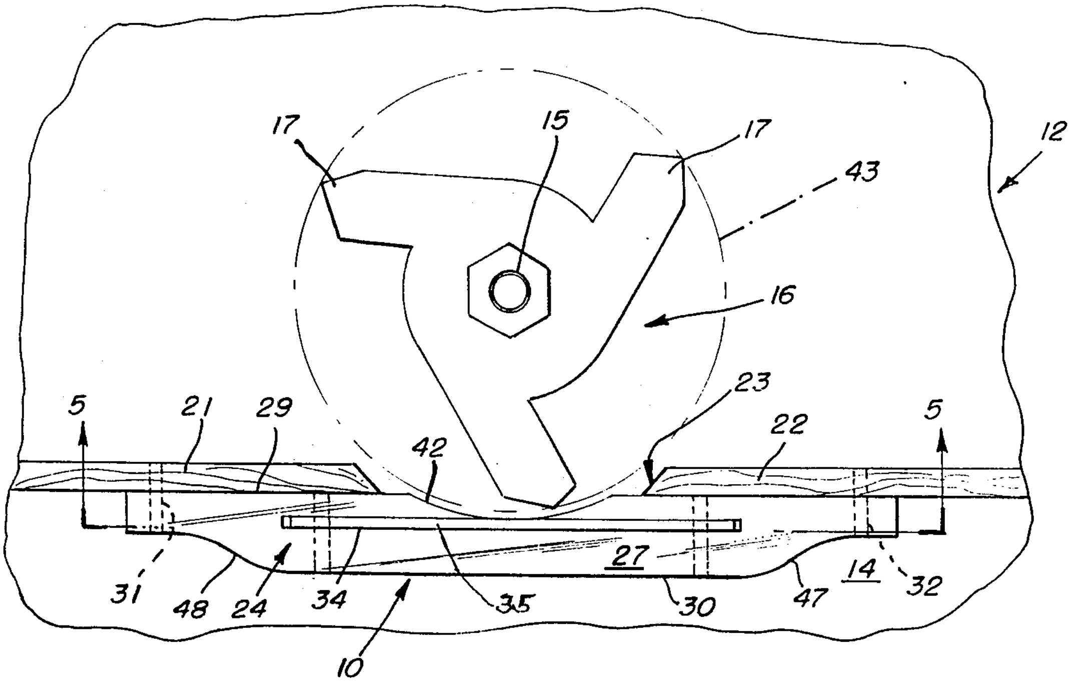
FIG. 4 is a fragmentary horizontal section taken along the line 4—4 of FIG. 1.

Formed in the rear surface 29 of the guard body 24 is an arcuate recess 42, preferably in the shape of a segment of a cylinder having a cylindrical axis which is substantially coincident with the vertical axis of the spindle 15. As best illustrated in FIG. 4, the arcuate recess 42 is spaced just outside the periphery of the shaper head 16, that is just outside the tips of the rotary blade 17 defined by the dashed line circle 43 (FIG. 4). The purpose of the arcuate recess 42 is to permit the periphery of the shaper head 16 to project through the space 23 between the fences in order to penetrate the rear edge of the workpiece W as the workpiece moves longitudinally beneath the guard body 24 and flush against the front surfaces of the fences 21 and 22, as illustrated in FIG. 4.

The overall thickness of the middle portion of the guard body 24 is substantially greater than the end portions 25 and 26 to provide sufficient room for the arcuate recess 42 and the vertical slot 34.

The length of the guard panel 35 is slightly less than the length of the guide slot 34 and has a height or depth greater than the depth of the guide slot 34 to permit the guide panel 35 to freely move vertically within its limited travel relative to the slot 34.

Although the panel slots 36 and 37 are illustrated as being substantially straight and vertical, the widths of the slots must be preferably greater than the diameter of the corresponding pins 38 and 39 to permit canting of the panel 35 relative to the guard body 24, as illustrated in FIG. 2, when the workpiece W engages the leading edge 44 of the bottom surface 40. It will be noted in the drawings, that the leading bottom surface portion 44 has a gradually curved surface convex downward in order to provide a cam effect when the leading end of the workpiece W strikes the bottom surface 40 as it moves from left to right over the work surface 14, as illustrated in FIG. 2. The trailing portion 45 of the bottom surface 40 may also be curved to provide a rocking surface when the panel 35 is canted, as illustrated in FIG. 2. However, the trailing surface 45 may have a shorter radius than the leading surface 44.

Moreover, the front surface 30 of the guard body 24 may have transversely curved cam surfaces 47 and 48 between the thicker middle portion of the guard body 24 and its opposite end portions 25 and 26. The cam surfaces 47 and 48 are not only decorative, but tend to guide the operator's hand on the workpiece W around the guard body 24 as the workpiece W is moved beneath the guard body 24.

In the operation of the apparatus, the shaper guard 10 is assembled upon the fences 21 and 22 to straddle the space 23 in front of the shaper head 16 and to be properly located above the work surface 14.

The guard panel 35 is pre-assembled within the vertical slot 34 by inserting the transverse pins 38 and 39 through the corresponding panel slots 36 and 37.

The guard body 24 is then carefully mounted upon the from surfaces of the fences 21 and 22 by the transverse bolts 31 and 32 so that the guard body 24 extends longitudinally and substantially horizontally in front of the cutting edges of the blades 17. A minimum space is provided between the bottom surface 28 and the work surface 14 to permit the longitudinal passage of a workpiece W along the top of the work surface 14 and beneath, not only the guard body 24, but also the bottom surface 40 of the guard panel 35, when the guard panel 35 has been elevated by the workpiece W, as illustrated in FIG. 3. Initially, as disclosed in FIG. 2, the leading edge of the workpiece W engages the leading arcuate bottom surface portion 44 of the panel 35, rocking the panel 35 upward on the right end and about the curved, trailing bottom portion 45, on the left end, in order to cant the panel 35. In this manner, the guard panel 35, even though partially raised, still has its left or trailing portion low enough to cover most of the space beneath the main guard body 24 in front of the rotating cutter blades 17. Then, as the workpiece W moves toward the left, as illustrated in FIG. 2, the remainder of the guard panel 35 is elevated by the workpiece W. The workpiece W occupies all of the space beneath the guard panel 35 while the guard panel 35 rests upon the workpiece W to completely occlude any open space in front of, and at the same level as, the shaper head 16.

Even though the guard body 24 and the guard panel 35 completely cover the area in front of and in the same horizontal plane as the rotating blade 17, nevertheless, the operator handling the workpiece W still has a clear view of the cutting action of the shaper head 16 from above, along the rear edge of the workpiece W, as illustrated in FIG. 4. By keeping his hands on the workpiece W, the operator's hands will always be protected because the workpiece W is below the guard body 24 and below and engaging the bottom surface 40 of the guard panel 35. Accordingly, either the guard body 24 or the guard panel 35 is always between the operator's hands on the workpiece W and the rapidly rotating shaper blades 17.

It will be noted that the only force acting upon the guard panel 35 is that of gravity. Therefore, since there are no springs incorporated in the shaper guard 10, the workpiece W is never positively clamped against the work surface 14. Thus, the guard panel 35 functions solely as a guard cooperating with the work surface 14 and the workpiece W to always close any access to the rotating blades 17, without affecting the ability of the operator to feed and manipulate the workpiece W longitudinally or transversely relative to the shaper head 16.

What is claimed is:

1. A guard for a shaper apparatus including a table having a planar work surface, a shaper head mounted for rotary movement about a vertical axis above the work surface, and a fence for guiding a workpiece along the work surface into operative engagement with the shaper head, comprising:

(a) an elongated guard body having top and bottom surfaces, front and rear surfaces, and opposite end portions, (b) support means supporting said guard body in a fixed position in front of and adjacent said shaper head, so that said bottom surface is spaced above said work surface to permit a workpiece to be moved along said work surface and beneath said bottom surface for operative engagement of said workpiece with said shaper head, (c) said guard body having an elongated guide slot extending vertically through said body and opening through said bottom surface, (d) an elongated guard panel received in said guide slot, said panel having a length slightly less than the length of said guide slot, (e) mounting means supporting said guard panel in said guide slot for limited vertical travel between a lower position and an upper position, and (f) said guard panel having an elongated bottom surface adapted normally to rest upon said work surface in said lower position, but adapted to be engaged and elevated to an upper position by a workpiece moving longitudinally beneath said guard body.

2. The invention according to claim 1 in which said guard panel has opposite end portions, said mounting means comprising a vertical panel slot formed through each of said opposite end portions of said panel and further comprising a pair of pins extending front-to-rear through said guide slot, each of said pins extending through a corresponding panel slot to permit free vertical movement of said panel within said guide slot.

3. The invention according to claim 1 further comprising an arcuate recess formed in said rear surface of said guard body concave rearward and having a vertical axis of curvature, said recess surrounding and being spaced from the periphery of the rotary path of said shaper head.

4. The invention according to claim 3 in which said arcuate recess is a cylindrical segment having an axis of curvature coincidental with the rotary axis of said shaper head.

5. The invention according to claim 1 in which the bottom surface of said guard panel has a leading end portion which is arcuate and convex downward to form a cam surface for engagement with the leading edge of a workpiece moving toward said guard panel to facilitate the elevation of said guard panel relative to said guard body.

6. The invention according to claim 1 in which said front surface of said guard body comprises transversely curved surfaces in its opposite end portions to facilitate guiding of the hand of an operator manipulating a workpiece along said guard body.

7. The invention according to claim 1 in which said guard panel is biased downwardly within said guide slot solely by the weight of said guard panel.

8. The invention according to claim 1 further comprising said planar work surface, said shaper head mounted for rotary movement above said work surface, and said fence projecting above said work surface, said fence comprising a pair of longitudinally aligned fence sections spaced on opposite sides of said shaper head, said support means supporting said guard body on said fence sections to span the spacing between said fence sections in front of said shaper head.

* * * * *